(12) United States Patent
Murao et al.

(10) Patent No.: US 6,722,627 B2
(45) Date of Patent: Apr. 20, 2004

(54) ELECTROMAGNETIC VALVE DEVICE AND MANUFACTURING METHOD THEREOF

(75) Inventors: Yoshiyuki Murao, Kariya (JP); Futoshi Kawamura, Kariya (JP); Hiroshi Sumiya, Hekinan (JP); Sanemasa Kawabata, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/317,206

(22) Filed: Dec. 12, 2002

(65) Prior Publication Data
US 2003/0116739 A1 Jun. 26, 2003

(30) Foreign Application Priority Data
Dec. 13, 2001 (JP) ........................................ 2001-380371

(51) Int. Cl.⁷ .............................................. F16K 31/06
(52) U.S. Cl. ............................. 251/129.15; 251/129.07
(58) Field of Search ...................... 251/129.01–129.22

(56) References Cited

U.S. PATENT DOCUMENTS

| | | | | |
|---|---|---|---|---|
| 4,984,549 A | * | 1/1991 | Mesenich | 123/472 |
| 5,261,371 A | * | 11/1993 | Sumida et al. | 123/339.27 |
| 5,639,061 A | * | 6/1997 | Krauter et al. | 251/77 |
| 6,024,302 A | * | 2/2000 | Sumida et al. | 239/585.5 |
| 6,561,482 B2 | * | 5/2003 | Okii | 251/129.15 |

FOREIGN PATENT DOCUMENTS

| | | |
|---|---|---|
| JP | 7-35257 | 2/1995 |
| JP | 2000-145567 | 5/2000 |
| JP | 2001-187979 | 7/2001 |
| JP | 2001-263524 | 9/2001 |

* cited by examiner

*Primary Examiner*—Paul J. Hirsch
(74) *Attorney, Agent, or Firm*—Nixon & Vanderhye P.C.

(57) ABSTRACT

An electromagnetic valve device reduces wear of a moving member and a non-magnetic member sliding against the moving member and prevents contamination from contacting the sliding part. The moving member is directly and movably supported in a reciprocating manner by a non-magnetic cup. The moving member has a hard layer made of nickel containing PTFE (polytetrafluoroethylene) particles at the sliding part located against the cup. The hardness of the hard layer is high and is approximately the hardness of the stainless steel cup. Therefore, the wear of both the moving member and the cup can be reduced. The hard layer contains the PTFE particles, and therefore the sliding part between the moving member and the cup is lubricated by the PTFE, which reduces the sliding resistance at the sliding part and improves the responsiveness of the device.

10 Claims, 4 Drawing Sheets

ELECTROMAGNETIC VALVE DEVICE AND MANUFACTURING METHOD THEREOF

CROSS REFERENCE TO RELATED APPLICATION

This application is based upon, claims the benefit of priority of, and incorporates by reference the contents of prior Japanese Application No. 2001-380371 filed Dec. 13, 2001.

BACKGROUND OF THE INVENTION

1. Field of the Invention

The present invention relates to an electromagnetic valve device that supports a moving member in a reciprocating fashion and a manufacturing method thereof.

2. Description of the Related Art

At least one known electromagnetic valve device comprises a valve member reciprocating together with a moving member inside an electromagnetic driving portion. This controls the flow rate of a fluid that passes through a fluid path. In this electromagnetic valve device, the flow rate of the fluid is controlled by movement of the valve member so that the fluid path is opened or closed, or alternatively, the area of the fluid path is changed.

The moving member that drives the valve member is movably supported in a reciprocating manner in a stator. The conventional moving member is supported, for example, by a roller bearing. In recent years, there has been a demand for an electromagnetic valve device that can carry out various types of performance and yet still be manufactured at a minimal cost. This creates demand for a more inexpensive manner of supporting the moving member that does away with use of expensive roller bearing supports. A technique of directly supporting a moving member using a cup-shaped, non-magnetic member has been suggested. In this method, the non-magnetic member is located between the moving member and the stator, and the moving member moves slidably within the non-magnetic member.

In the above-mentioned device, where the moving member is supported by the non-magnetic member, the moving member and the non-magnetic member both slide against each other and thus the surfaces thereof are prone to wear. During operation of the electromagnetic valve device, the moving member always receives force in the reciprocating direction during movement. As a result, surface wear occurs between the outer wall of the moving member and the inner wall of the non-magnetic member that slide against each other. Typically, the moving member and the non-magnetic member are made of materials having a different hardness, and the member made of the material with the lower hardness wears faster. For example, when pure iron is used for the material of the moving member and stainless steel is used for the material of the non-magnetic member, the moving member whose hardness is lower wears faster. As a further example, when the moving member is coated with resin on the surface, the hardness of the surface of the moving member cannot be increased, and hence wear can hardly be reduced.

In the electromagnetic driving portion, the moving member and the stator form a magnetic circuit. Therefore, when the moving member is worn, the characteristics of the magnetic circuit, and more particularly, the operational characteristics of the electromagnetic driving portion will be changed. A further problem caused by wear is that the non-magnetic member provided between the moving member and the stator is thin. Therefore, when the non-magnetic member is worn, fluid from the fluid path can leak. A further problem of wear is that when the non-magnetic member is worn, the inner wall of the nonmagnetic member that slides against the outer wall of the moving member can become rough. This can result in operational failure and an increase in operation hysteresis. This in turn can cause the responsiveness of the device to deteriorate.

SUMMARY OF THE INVENTION

It is an object of the present invention to provide an electromagnetic valve device with high responsiveness that reduces wear of a moving member and a non-magnetic member sliding against the moving member and prevents contamination from entering the sliding part.

Another object of the invention is to provide a method of manufacturing an electromagnetic valve device that allows the hysteresis between the moving member and the non-magnetic member to be reduced.

In an electromagnetic valve device according to a first (or eighth) aspect of the present invention, the moving member has a hard portion at the sliding part that slides against the non-magnetic member. The hard portion has a hardness near that of a hardness of the non-magnetic member, and therefore, the outer wall of the moving member and the inner wall of the non-magnetic member that slide against each other have nearly the same hardness. Therefore, the wear of only one of the moving member and the non-magnetic member can be reduced. The hard portion has a hardness close to the non-magnetic member, so that the hardness of both the moving member and the non-magnetic member can be improved, and the wear caused by sliding can be reduced.

In the electromagnetic valve device according to a second aspect of the invention, the hard portion includes a metal layer containing a solid lubricating material. The solid lubricating material is a solid having a small friction coefficient, and the material lubricates the area between the surface of the hard portion and the inner wall of the non-magnetic member. Therefore, not only can the wear of the moving member and the non-magnetic member be reduced by the improvement in hardness, but also the sliding resistance between the moving member and the non-magnetic member can be reduced. By reducing the sliding resistance, the wear of the moving member and the non-magnetic member can be reduced. Since the sliding resistance is reduced, the driving force necessary to drive the moving member can be reduced. Furthermore, since the sliding resistance is reduced, the moving member can more smoothly move, which can improve the responsiveness and performance of the device.

In the electromagnetic valve device according to a third aspect of the invention, the solid lubricating material is in the form of particles made of fluororesin. Fluororesin has a small friction coefficient and is inexpensive, and hence the sliding resistance between the moving member and the non-magnetic member can be reduced without increasing the cost.

In the electromagnetic valve device according to a fourth aspect of the invention, the particles made of fluororesin are contained in the hard portion in the range from 5 vol % to 40 vol %. More specifically, the hard portion contains particles made of fluororesin in the described ratio. When the content of the particles made of fluororesin is smaller than 5 vol %, the wear of the moving member is not reduced, and hence the effect of mixing the particles made of fluororesin is not obtained. Meanwhile, when the content of the particles made of fluororesin is larger than 40 vol %, a sufficient hard portion is not formed, and hence the effect of reducing the wear by forming the hard portion is not provided. Therefore, by specifying the content of particles made of fluororesin to be in the above percentage range, wear and sliding resistance can be reduced.

In the electromagnetic valve device according to a fifth aspect of the invention, polytetrafluoroethylene may be applied as the fluororesin.

In the electromagnetic valve device according to a sixth aspect of the invention, molybdenum disulfide may be applied as the solid lubricating material.

In the electromagnetic valve device according to a seventh aspect of the invention, the metal forming the metal layer is nickel. Nickel has high hardness which is close to the hardness of stainless steel, for example, forming the non-magnetic member. Therefore, wear of the moving member and the non-magnetic member can be reduced.

In the electromagnetic valve device according to a ninth aspect of the invention, the moving member is formed to have an axial length larger than the axial length of the bottom-closed tube portion of the non-magnetic member. When the movement of the moving member in one direction is at its maximum, in other words, when the moving member is not attracted toward the suction portion, the end of the moving member on the side of the valve member is positioned closer to the side of the valve member than to the joint between the tube portion and the tapered portion. The moving member is protruded toward the inner circumferential side of the tapered portion from the bottom-closed tube portion. The moving member thus has a region that does not slide against the non-magnetic member. Therefore, contamination can be prevented from entering the inner circumferential side of the bottom-closed tube portion and between the moving member and the non-magnetic member that form the sliding part. Therefore, wear caused by contamination entering into the sliding part can be prevented.

In the electromagnetic valve device according to a tenth aspect of the invention, there is a gap formed between the outer wall of the suction portion and the inner wall of the large diameter portion. Along with the movement of the moving member, the fluid on the inner circumferential side of the stator is moved in the moving direction of the moving member. At that time, the fluid flows along the outer wall of the suction portion. Therefore, contamination contained in the fluid is allowed to travel with the flow of the fluid into the gap formed between the outer wall of the suction portion and the inner wall of the large diameter portion. The suction portion has its outer diameter expanded from the moving member side to the valve member in a tapered shape, and therefore the gap is narrower toward the valve member side. As a result, contamination is carried along with the flow of the fluid toward the valve member side of the gap and captured. In this way, contamination can be prevented from coming into the sliding part formed between the moving member and the non-magnetic member. Therefore, wear of the moving member and the non-magnetic member caused by the contamination can be reduced.

In the electromagnetic valve device according to an eleventh aspect of the invention, the hard portion containing a solid lubricating material is formed on the surface of the moving member, and then the surface of the hard portion is ground. When the hard portion is formed by electroless plating, the surface of the hard portion becomes rough by a hydrogen gas generated in the process of plating. Therefore, the hard portion is ground to smooth the surface. In this way, when the moving member having the hard portion is assembled in the inner circumference of the non-magnetic member, the sliding resistance between the moving member and the non-magnetic member is reduced. Consequently, hysteresis between the moving member and the non-magnetic member can be reduced.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 2:
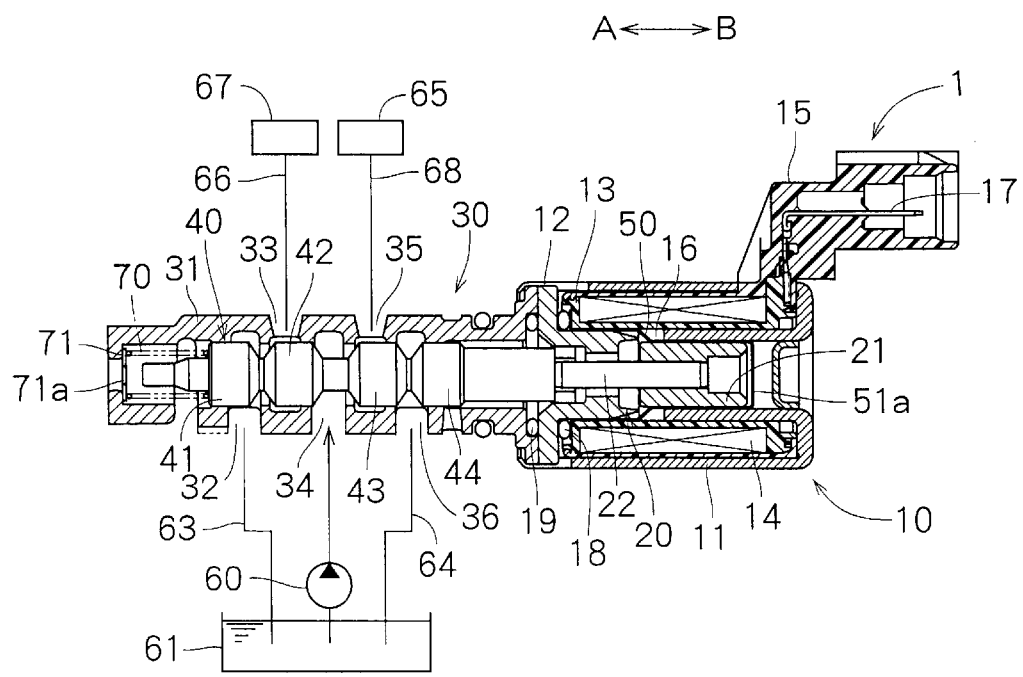
FIG. 2 is a cross-sectional view of a hydraulic control valve device to which an electromagnetic valve device according to one embodiment of the invention is applied.

The following description of the preferred embodiment(s) is merely exemplary in nature and is in no way intended to limit the invention, its application, or uses. The embodiment shown in FIG. 2 is an application of an electromagnetic valve device according to an embodiment of the invention in a hydraulic control valve in a valve timing control system in an internal combustion engine. In FIG. 2, electrical current to the electromagnetic driving portion 10 is stopped. The arrows A and B in FIG. 2 represent the directions in which the plunger 20 reciprocates.

The hydraulic control valve 1 includes the electromagnetic driving portion 10 and a spool control valve portion 30. The electromagnetic driving portion 10 is supplied with current to cause magnetic attraction force. In the spool control valve portion 30, the plunger 20 and a spool 40 as a valve member reciprocate in order to regulate the amount of a hydraulic fluid to be supplied (discharged) to (from) a retard hydraulic chamber 67 and an advance hydraulic chamber 65. The yoke 11 of the electromagnetic driving portion 10 and the sleeve 31 of the spool control valve portion 30 are secured or fixed together by crimping or welding.

The electromagnetic driving portion 10 has the yoke 11, a fixed core 12, a bobbin 13, a coil 14 wound around the bobbin 13, the plunger 20, and a cup 50 serving as a non-magnetic member. The yoke 11 and the fixed core 12 form a stator. The fixed core 12 and the cup 50 are held between the yoke 11 and the sleeve 31.

Figure 1:
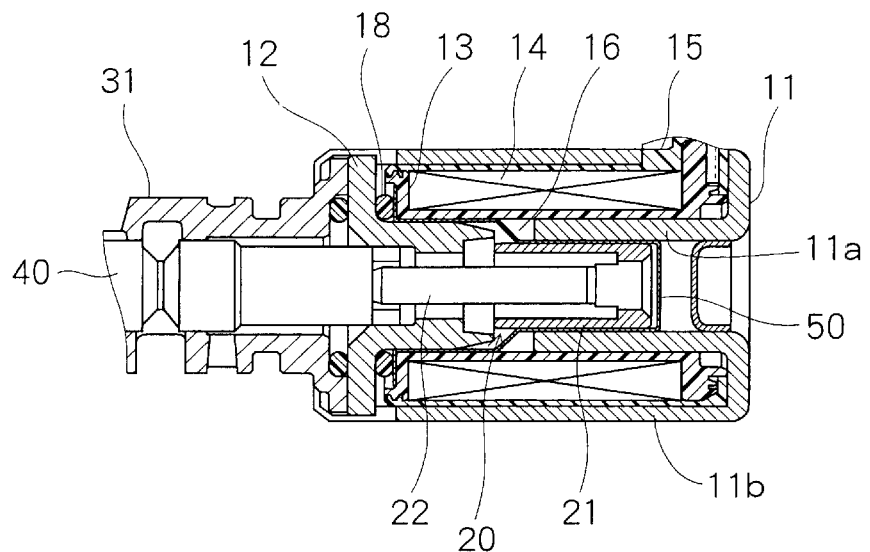
FIG. 1 is a cross-sectional view of a hydraulic control valve device to which an electromagnetic valve device according to one embodiment of the invention is applied, showing the vicinity of the electromagnetic driving portion being enlarged.

As shown in FIG. 1, the yoke 11 has an inner tube portion 11a and an outer tube portion 11b (as a tube portion as recited in the appended claims), and the bobbin 13 and the coil 14 are stored in the space between the inner tube portion 11a and the outer tube portion 11b. The inner tube portion 11a covers the outer periphery of the moving member 21. The bobbin 13 and the coil 14 are covered with a resin material 15.

Figure 3:
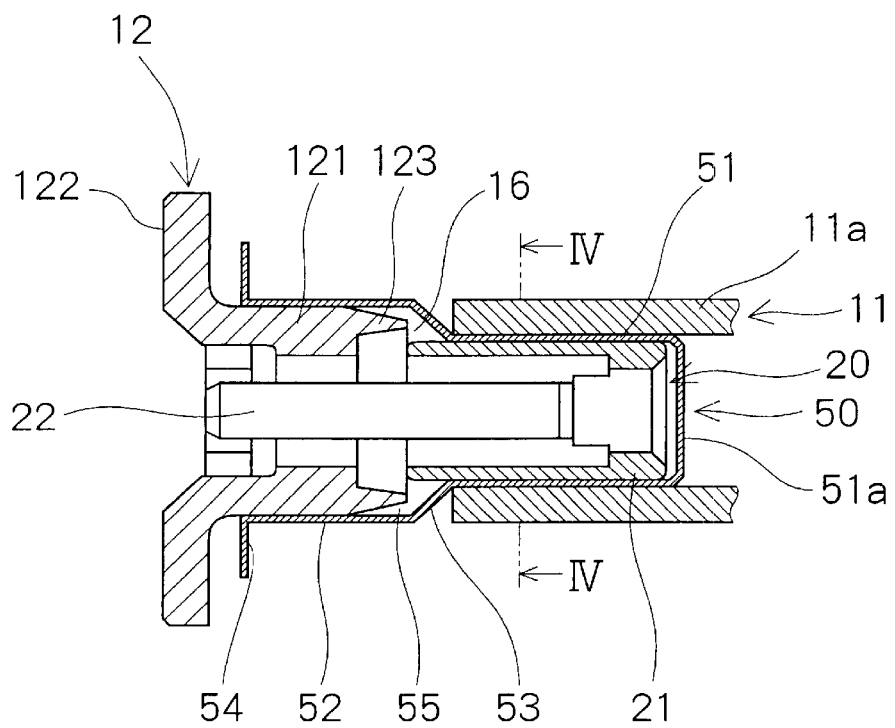
FIG. 3 is a cross-sectional view of a plunger, a stator, and a cup in a hydraulic control valve device to which an electromagnetic valve device according to the embodiment of the invention is applied.

As shown in FIG. 3, the fixed core 12 has a body portion 121, a flange portion 122, and a suction portion 123. The body portion 121 is formed in a substantially cylindrical shape and supports the plunger 20 and the spool 40 in a reciprocating manner in the inside as shown in FIG. 1. As shown in FIG. 3, the flange portion 122 is formed at an end of the body portion 121 on the side of the sleeve 31 and extends outwardly in the radial direction from the body portion 121. The suction portion 123 is formed at the end of the body portion 121 on the opposite side of the sleeve. The outside diameter of the suction portion 123 increases toward the spool 40 from the end facing the moving member 21, in other words, the suction portion 123 is tapered. This allows the thickness of the suction portion 123 to gradually decrease toward the inner tube portion 11a of the yoke 11. The inner tube portion 11a of the yoke 11 and the suction portion 123 of the fixed core 12 oppose each other and form a gap 16 having a prescribed length in the reciprocation directions of the plunger 20.

As shown in FIG. 2, the coil 14 has its winding end connected to a terminal 17 and is supplied with control current from the terminal 17. When the coil 14 is supplied with the control current, the moving member 21 is attracted toward the suction portion 123 of the fixed core 12 against the energizing force of the spring 70 as the energizing means in abutment against the spool 40. The energizing force of the spring 70 acts in the direction denoted by arrow B in FIG. 2, which is one of the reciprocation directions of the plunger 20. The magnetic force generated by supply of the current to the coil 14 acts to attract the moving member 21 in the direction denoted by arrow A in FIG. 2, which is the other reciprocating direction of the plunger 20.

As shown in FIG. 3, the cup 50 made of a non-magnetic material such as stainless steel has a bottom-closed tube portion 51, a large diameter portion 52, a tapered portion 53, and a flange portion 54. The bottom 51a of the bottom-closed tube portion 51 covers one end of the plunger 20 in the reciprocation directions. The large diameter portion 52 has a diameter larger than that of the bottom-closed tube portion 51 and covers the outer periphery of the fixed core 12 whose outer diameter is larger than that of the plunger 20. The tapered portion 53 connects the bottom-closed tube portion 51 and the large diameter portion 52. Therefore, the tapered portion 53 extends from the bottom-closed tube portion 51 located at the inner circumferential side of the inner tube portion 11a in the yoke 11 to the large diameter portion 52 located at the outer circumferential side of the fixed core 12 and defining a gap 16 therebetween. The inner diameter of the large diameter portion 52 is substantially equal in the reciprocation directions of the plunger 20. Therefore, a gap 55 is formed between the outer wall of the suction portion 123 of the fixed core 12 and the inner wall of the large diameter portion 52. The gap 55 is reduced in size toward the body portion 121 of the fixed core 12. The flange portion 54 is connected to the end of the large diameter portion 52 at the side opposite to the tapered portion and, as shown in FIG. 1, held between the fixed core 12 and the bobbin 13.

The plunger 20 has the moving member 21 and a shaft 22 protruding toward the spool 40 from the moving member 21. The moving member 21 has a tubular shape, and the shaft 22 is press-inserted into the inner circumference. In this way, the moving member 21 and the shaft 22 integrally form the plunger 20. Therefore, when current passes across the coil 14, the moving member 21 and the shaft 22 move together. The plunger 20 is movably supported in a reciprocating manner at the inner circumferential side of the cup 50. The moving member 21 is made of a magnetic material such as pure iron in order to form the magnetic circuit together with the yoke 11 and the fixed core 12.

As shown in FIG. 3, the entire length of the moving member 21 in the axial direction or reciprocation directions is larger than the entire length of the bottom-closed tube portion 51 of the cup 50. When current is not passed across the coil 14, in other words, when the movement in the direction denoted by the arrow B in FIG. 2 is maximum, the moving member 21 has its end on the side of the spool 40 located closer to the side of the spool 40 than to the joint between the bottom-closed tube portion 51 and the tapered portion 53 of the cup 50. In this way, the end of the moving member 21 protrudes toward the fixed core 12 from the bottom-closed tube portion 51, and there is a region of the moving member 21 that does not slide against the bottom-closed portion 51 of the cup 50. This prevents contamination from entering the inner circumferential side of the bottom-closed tube portion 51 and the sliding part between the moving member 21 and the bottom-closed tube portion 51.

As shown in FIG. 2, an O-ring 18 is provided between the flange portion 54 of the cup 50 and the flange portion 122 of the fixed core 12 and prevents hydraulic fluid from leaking from between the flange portion 54 and the flange portion 122. An O-ring 19 is provided between the flange portion 122 of the fixed core 12 and the sleeve 31 and prevents the hydraulic fluid from being leaked from between the flange portion 122 and the sleeve 31.

The spool control valve portion 30 has the sleeve 31 and the spool 40. A plurality of openings 32, 33, 34, 35, and 36 are formed in prescribed positions in the wall of the sleeve 31 and the hydraulic fluid can pass through the openings. A pump 60 pumps to supply the hydraulic fluid from a fluid tank 61 to the opening 34. The openings 32 and 36 are open toward the fluid tank 61 through fluid paths 63 and 64, respectively. The opening 33 is in communication with the retard hydraulic chamber 67 through a fluid path 66, and the opening 35 is in communication with the advance hydraulic chamber 65 through a fluid path 68.

The spool 40 is slidably supported in the axial directions at the inner wall of the sleeve 31. The spool 40 consists of large diameter portions 41, 42, 43, and 44 that are land portions each having substantially the same diameter as the inner diameter of the sleeve 31, and small diameter portions connecting the large diameter portions. The end of the spool 40 on the side of the plunger 20 abuts the end of the shaft 22. In this way, the moving member 21 and the shaft 22, which is formed integrally with the moving member 21, that form the plunger 20, reciprocate so that the spool 40 is driven to reciprocate on the inner circumference of the sleeve 31.

A spring 70 has one end that abuts against the end of the spool 40 on the side opposite to the plunger, and the other end abuts against a plate 71. The spring 70 energizes the spool 40 in the direction denoted by arrow B in FIG. 2. The plate 71 is an annular thin plate having a through hole 71a formed in its center.

Now, the moving member 21 will be described in detail.

Figure 4:
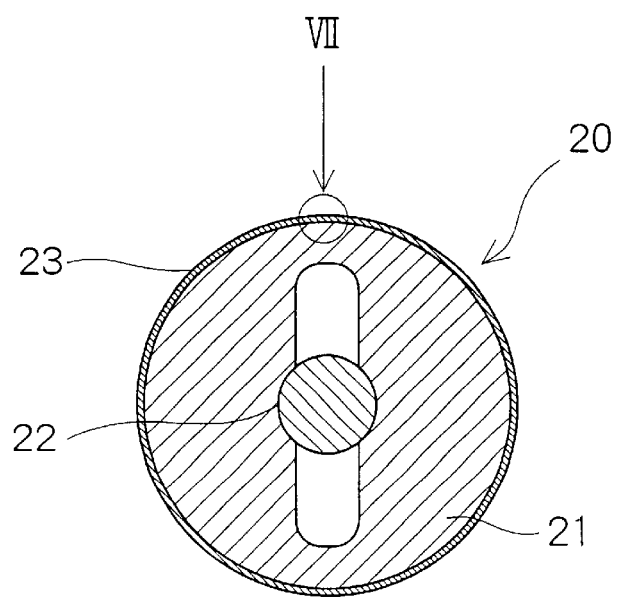
FIG. 4 is a cross-sectional view of the plunger taken along line IV—IV in FIG. 3.

The moving member 21 slides against the bottom-closed portion 51 of the cup 50. As described above, the moving member 21 is made of a pure iron-based material, and the cup 50 is made of a stainless steel-based material. The iron-based moving member 21 and the stainless steel-based cup 50 have different hardnesses, and therefore as shown in FIG. 4, the moving member 21 has a hard layer 23 as a hard portion formed around its outer periphery, i.e., at the sliding part where the moving member 21 slides against the cup 50. The hard layer 23 is made of a metal layer containing a solid lubricating material. The hard layer 23 is made of nickel in the present embodiment. Nickel, which is inexpensive and has a high hardness, can improve the hardness at the outer periphery of the moving member 21. Not only nickel but also chromium or the like may be used as the metal for the hard layer 23. The hard layer 23 may be made by depositing a metal layer at the outer periphery of the moving member 21, for example, by electroless plating, vapor deposition, or electroplating.

The hard layer 23 includes a solid lubricating material. The solid lubricating material is a solid with a small friction coefficient. The material contained in the hard layer 23 provides lubrication between the moving member 21 and the bottom-closed tube portion 51 of the cup 50. Fluororesin or molybdenum disulfide may be used as the solid lubricating material. Examples of the fluororesin include polytetrafluoroethylene (PTFE), a tetrafluoroethylene-ethylene-hexafluoropropylene copolymer (FEP), and a tetrafluoroethylene-perfluoroalkylvinylether copolymer (PFA). In the present embodiment, PTFE is used as the fluororesin.

The hard layer 23 contains the solid lubricating material, so that not only the wear caused by the difference in hardness between the moving member 21 and the cup 50 is reduced, but also lubrication is provided between the moving member 21 and the cup 50. This reduces the resistance during the operation of the hydraulic control valve device 1. In this way, the hydraulic control valve device 1 has improved responsiveness.

The solid lubricating material, PTFE is provided in the form of powder or particles and contained in the hard layer 23. The PTFE particles are contained in the hard layer 23 in the range from 5 vol % to 40 vol %, when the hard layer 23 is formed at the moving member 21.

Figure 5:
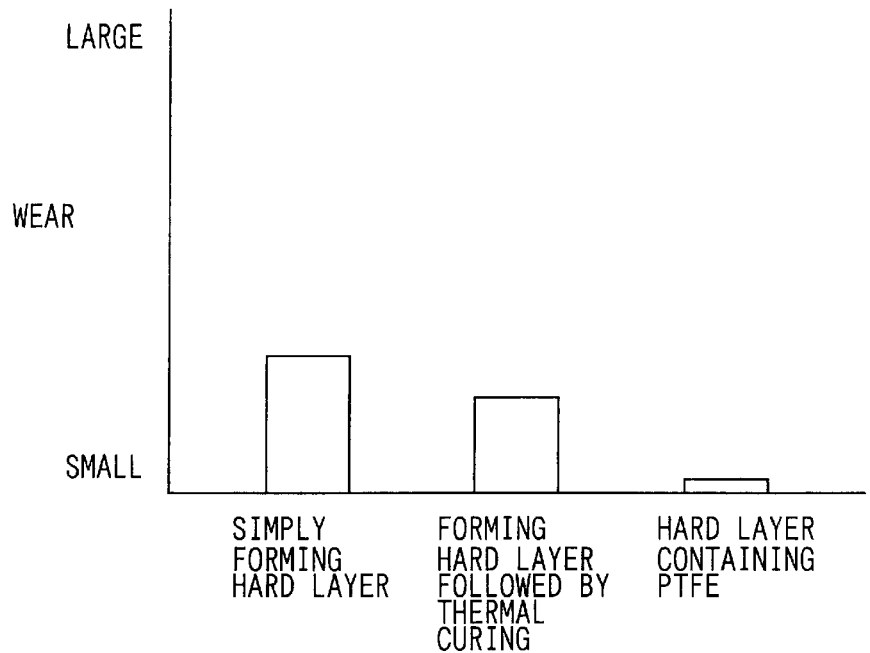
FIG. 5 is a bar graph showing relationships between the processed state of the surface of a moving member and its associated wear.

FIG. 5 shows the relation between the processing of the outer periphery of the moving member 21 and the wear when the moving member 21 is reciprocated a prescribed number of times. As shown in FIG. 5, the wear of the moving member 21 with the hard layer 23 containing PTFE particles is smaller than the wear of the moving member 21 simply provided with a hard layer of nickel and the moving member provided with the hard layer thermally cured after the formation of the hard layer. More specifically, when the PTFE particles are contained in the hard layer 23, the wear of the moving member 21 and the cup 50 is reduced.

Note that when the moving member 21 is coated with fluororesin for example, the sliding resistance can be reduced with the fluororesin, but the hardness of the moving member 21 cannot be increased, and the wear cannot be reduced.

Figure 6:
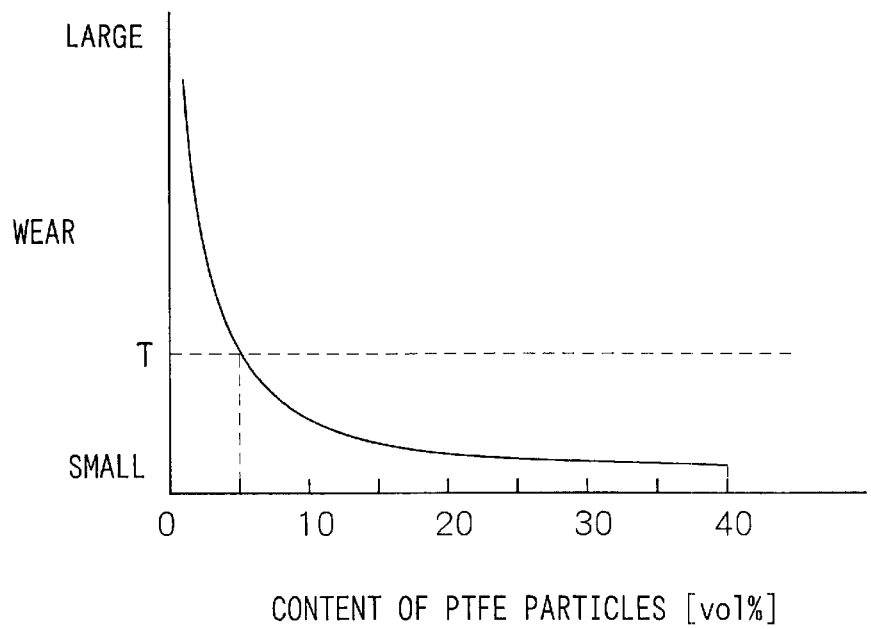
FIG. 6 is a line graph showing relationships between the vol % content of PTFE in a hard layer and the wear of a moving member.

When the relation between the content of PTFE particles in the hard layer 23 and the wear after the moving member 21 is reciprocated a prescribed number of times is considered, the result as shown in FIG. 6 is given. Suppose that a target value for the wear of the moving member 21 is set as T, and that the content of PTFE is set so that the wear after the moving member 21 is reciprocated a prescribed number of times is not more than the target value T. In this case, as shown in FIG. 6, when the content of PTFE particles in the hard layer 23 is smaller than 5 vol %, the target T cannot be reached. When the content of the PTFE particles in the hard layer 23 is smaller than 5 vol %, the PTFE particle distribution in the hard layer 23 is low. In other words, the frequency of the PTFE particles in the hard layer 23 is lower and sufficient lubrication by the PTFE particles cannot be provided.

When the content of the PTFE particles in the hard layer 23 is 5 vol % or more, the wear of the moving member 21 is reduced as the PTFE content increases. However, when the content of the PTFE in the hard layer 23 is larger than 40 vol %, the PTFE content in the hard layer 23 is excessive, and the hard layer 23 cannot be formed. In other words, when the PTFE content is larger than 40 vol %, the hard layer 23, having a hardness close to that of the cup 50, cannot be formed. In order to provide both, lubrication with the PTFE particles and a reduction in the wear with the hard layer 23, at the same time, it is preferred that the content of the PTFE particles in the hard layer 23 be in the range from 5 vol % to 40 vol %.

Now, a method of manufacturing the moving member 21 in the hydraulic control valve device 1 will be described. The tubular moving member 21 is provided with the hard layer 23. In this embodiment, the hard layer 23 is formed in the moving member 21 by electroless plating using nickel for the metal layer.

Figure 7:
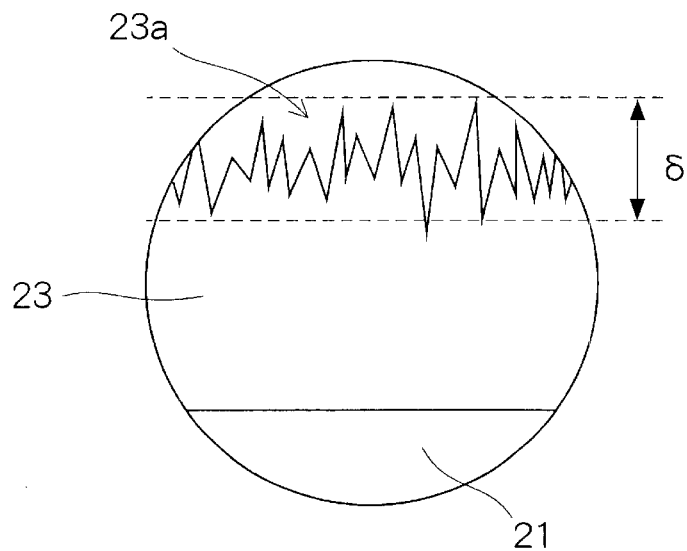
FIG. 7 is an enlarged schematic view of the top surface of a hard layer, showing the part denoted by arrow VII in FIG. 4.

Meanwhile, when the hard layer 23 is formed in the outer periphery of the moving member 21 by electroless plating, a hydrogen gas is generated in the process of plating. In this case, the hydrogen gas generated on the inner circumferential side of the hard layer 23 to be formed is passed through the hard layer 23 and discharged outside the hard layer 23. Therefore, as shown in FIG. 7, the top surface 23a located at the outermost side of the hard layer 23 becomes rough from the passage of the hydrogen gas. As a result, the surface roughness at the top surface 23a of the hard layer 23 sliding against the cup 50 is increased (deteriorates).

Figure 8:
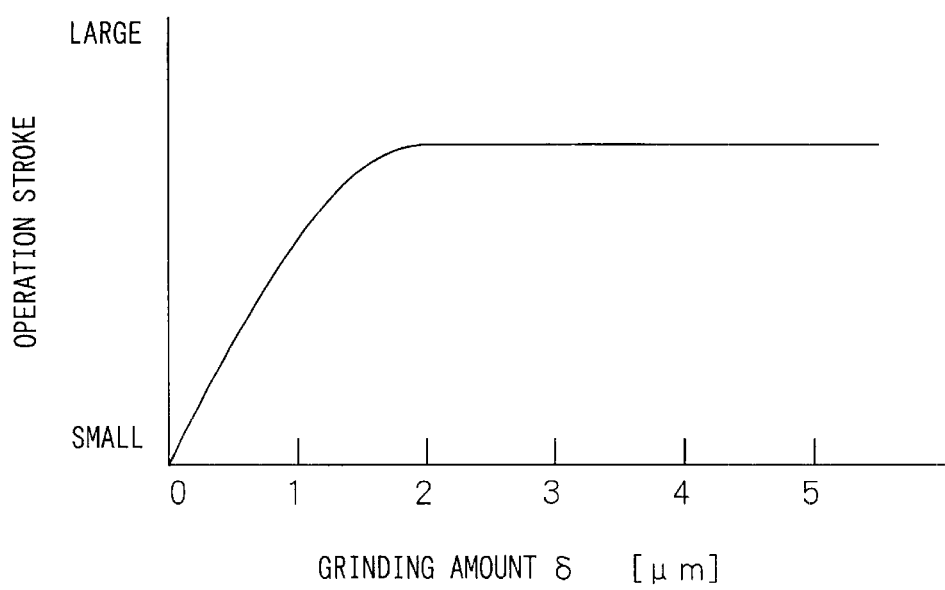
FIG. 8 is a graph showing the relation between the grinding amount of the hard layer of a moving member and the operation stroke.

In the embodiment, after the moving member 21 is provided with the hard layer 23, the formed hard layer 23 is ground. FIG. 8 is a graph showing the relation between the grinding amount δ and the operating stroke. As shown in FIG. 7, the grinding amount δ means the amount to grind the hard layer 23 from the outermost periphery of the hard layer 23 to the inner circumferential portion, with respect to the radial direction. The moving member 21 makes a prescribed movement in response to a certain control current applied to the coil 14. The operation stroke refers to the movement of the moving member 21 when the control current applied to the coil 14 is changed by a prescribed amount.

As shown in FIG. 8, when the grinding amount δ of the hard layer 23 is larger than 2 μm, the operating stroke is substantially fixed. More specifically, when the grinding amount of the hard layer 23 is greater than 2 μm, the operating stroke is substantially fixed regardless of the grinding amount. This is because the hydrogen generated in the process of electroless plating causes the top surface 23a of the hard layer 23 to have roughness approximately 2 μm thick. Therefore, as shown, if the hard layer 23 is ground for more than 2 μm, there is not much effect in improving the surface roughness of the top surface 23a of the hard layer 23. The roughness of the top surface 23a is approximately 2 μm thick regardless of the thickness of the hard layer 23. Therefore, the hard layer 23 may be ground to a depth of approximately 2 μm regardless of the thickness of the hard layer 23 formed at the moving member 21. In this way, the moving member 21 is formed.

Now, the operation of the hydraulic control valve device 1 according to the embodiment will be described. In the state shown in FIG. 2, no current is supplied to the coil 14. When the coil 14 is not supplied with current, a magnetic attraction force does not act upon the moving member 21, and the plunger 20 and the spool 40 are positioned as in FIG. 2 by the energizing force of the spring 70. More specifically, the plunger 20 has the largest movement in the direction denoted by arrow B in FIG. 2. At that time, the openings 34 and 35 of the spool control valve portion 30 are in communication with each other, and the connection between the openings 33 and 34 and between the openings 35 and 36 is shut off, so that the hydraulic fluid from the pump 60 is passed through the openings 34 and 35 and is supplied to the advance hydraulic chamber 65. Additionally, the openings 32 and 33 communicate with each other so that the hydraulic fluid in the retard hydraulic chamber 67 is discharged to the fluid tank 61.

When control current is supplied to the coil 14, the plunger 20 is attracted in the direction denoted by the arrow A in FIG. 2 against the energizing force of the spring 70, in other words, toward the suction portion 123. The spool 40 moves in the direction of the arrow A in FIG. 2 together with the plunger 20 and is engaged with the plate 71. Then, the openings 33 and 34 of the spool control valve portion 30 are communicated with each other, and the connections between the openings 34 and 35 and between the openings 33 and 32 are shut, so that the hydraulic fluid from the pump 60 passes through the openings 34 and 33 and is supplied to the retard hydraulic chamber 67. At that time, the openings 35 and 36 communicate with each other, so that hydraulic fluid in the advance hydraulic chamber 65 discharges into the fluid tank 61.

When the plunger 20 is attracted to the suction portion 123, a flow of the hydraulic fluid is formed on the side of the fixed core 12 of the plunger 20 as the plunger 20 moves. The fluid flow is formed along the outer wall of the suction portion 123 of the fixed core 12 and enters into the gap 55. Therefore, contamination generated by the sliding movement between the moving member 21 and the bottom-closed tube portion 51 and included in the hydraulic fluid are carried in the fluid flow and enter into the gap 55. The gap 55 is narrower toward the body portion 121, and therefore the contamination included in the hydraulic fluid are captured in the gap 55. As a result, the foreign matter deposited into the gap 55 can be prevented from entering into the inner circumferential side of the bottom-closed tube portion 51 along with the hydraulic fluid.

The position of the spool 40 is determined based on the balance of the magnetic attraction force acting upon the moving member 21 and the energizing force of the spring 70. Since the value of current supplied to the coil 14 and the generated magnetic force are proportionate to each other, the position of the spool 40 is linearly controlled by controlling the value of current supplied to the coil 14. Therefore, the amount of hydraulic fluid supplied to and discharged from the retard hydraulic chamber 67 and the advance hydraulic chamber 65 is regulated by the position of the spool 40.

According to the embodiment described above, the moving member 21 is provided with the hard layer 23 of nickel containing PTFE. The hard layer 23 is made of nickel, and the hardness of the moving member 21 and the cup 50 sliding against each other can be close to each other. Therefore, the wear of only one of the moving member 21 and the cup 50 can be reduced. Since the hardness of the moving member 21 and the cup 50 can both be improved, the wear of both the moving member 21 and the cup 50 can be reduced. In addition, the hard layer 23 is provided to the moving member 21, so that the hard layer 23 can be readily formed. The hard layer 23 contains a solid lubricating material of PTFE. Therefore, by providing the moving member 21 with the hard layer 23, the wear of the moving member 21 is reduced, and the sliding resistance at the sliding part can be reduced. In this way, the responsiveness of the hydraulic control valve device 1 can be improved. Consequently, the wear can be reduced and the responsiveness of the device can be improved at the same time.

According to the embodiment of the invention, the hard layer 23 is formed by electroless plating, and then the top surface 23a of the hard layer 23 is ground. In this way, the top surface 23a of the hard layer 23 which has rough surface generated at the time of forming the hard layer 23 can be smoothed. As a result, the sliding resistance between the moving member 21 and the cup 50 can be reduced, so that the responsiveness of the hydraulic control valve device 1 can be improved.

Furthermore, according to the embodiment of the invention, the moving member 21 has a part that does not slide against the bottom-closed tube portion 51 of the cup 50. Therefore, contamination can be prevented from entering the inner circumferential side of the bottom-closed tube portion 51 and the sliding part between the moving member 21 and the cup 50. Therefore, wear of the moving member 21 and the cup 50 by contamination contacting the sliding part can be prevented. The contamination included in the hydraulic fluid comes into the gap 55 formed between the outer wall of the suction portion 123 and the inner wall of the large diameter portion 52 along with the hydraulic fluid as the plunger 20 moves. Therefore, the contamination in the hydraulic fluid are contained within the gap 55 and can be prevented from contacting or entering the sliding portion formed between the moving member 21 and the cup 50. Consequently, the moving member 21 and the cup 50 can be prevented from wearing by the contamination contacting the sliding part.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electromagnetic valve device, comprising:
  a moving member;
  a valve member reciprocating together with said moving member, for controlling a flow rate of a fluid passing through a fluid path;
  an energizing means for energizing said moving member in a first reciprocating direction;

a coil portion for generating a magnetic force to attract said moving member in a second reciprocating direction;

a stator for forming a magnetic circuit with said moving member, the stator having a tube portion covering an outer periphery of said moving member and a suction portion forming a gap between said tube portion and itself in the first and second reciprocating directions of said moving member, the suction portion attracting said moving member in the second reciprocating direction; and a non-magnetic member provided at an inner circumference of said tube portion, for movably supporting said moving member in a reciprocating manner, the non-magnetic member covering an end of said moving member in one of the reciprocating directions, the non-magnetic member extending to said suction portion to cover an outer periphery of said suction portion, wherein said moving member has a hard portion with a hardness close to a hardness of said non-magnetic member at a sliding part against said non-magnetic member.

2. The electromagnetic valve device according to claim 1, wherein said hard portion comprises a metal layer containing a solid lubricating material.

3. The electromagnetic valve device according to claim 2, wherein said solid lubricating material is particulate and made of fluororesin.

4. The electromagnetic valve device according to claim 3, wherein the particles made of said fluororesin are contained in said hard portion in the range from 5 vol % to 40 vol %.

5. The electromagnetic valve device according to claim 4, wherein said fluororesin is polytetrafluoroethylene.

6. The electromagnetic valve device according to claim 2, wherein said solid lubricating material is molybdenum disulfide.

7. The electromagnetic valve device according to claim 2, wherein the metal forming said metal layer is nickel.

8. The electromagnetic valve device according to claim 7, wherein said non-magnetic material has a bottom-closed tube portion supporting said moving member at an inner circumferential location of said tube portion, a large diameter portion formed to have a diameter larger than that of said bottom-closed tube portion, and a tapered portion connecting said bottom-closed tube portion and said large diameter portion.

9. The electromagnetic valve device according to claim 8, wherein said moving member is formed to have an axial length larger than an axial length of said bottom-closed tube portion, and when a movement amount of said moving member in said first direction is maximum, the moving member has an end, near an end of said valve member, positioned closer to said valve member than to a joint between said bottom-closed tube portion and said tapered portion.

10. The electromagnetic valve device according to claim 9, wherein said suction portion is tapered with an outer diameter that increases from said moving member end portion toward said valve member, and the outer wall of said suction portion and the inner wall of said large diameter portion define a gap.

* * * * *